(12) United States Patent
Phillips et al.

(10) Patent No.: US 8,202,190 B2
(45) Date of Patent: Jun. 19, 2012

(54) MULTI-SPEED TRANSMISSION

(75) Inventors: Andrew W. Phillips, Saline, MI (US); Scott H. Wittkopp, Ypsilanti, MI (US); James M. Hart, Belleville, MI (US); Clinton E. Carey, Monroe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 946 days.

(21) Appl. No.: 12/174,249

(22) Filed: Jul. 16, 2008

(65) Prior Publication Data

US 2009/0054196 A1 Feb. 26, 2009

Related U.S. Application Data

(60) Provisional application No. 60/957,765, filed on Aug. 24, 2007.

(51) Int. Cl.
*F16H 3/62* (2006.01)
*F16H 3/44* (2006.01)

(52) U.S. Cl. ......... 475/275; 475/277; 475/288; 475/311
(58) Field of Classification Search .......... 475/275–293, 475/303, 311–313, 317–319, 323–325
See application file for complete search history.

(56) References Cited

U.S. PATENT DOCUMENTS

| | | | |
|---|---|---|---|
| 4,744,267 A * | 5/1988 | Lepelletier | 475/276 |
| 6,176,803 B1 | 1/2001 | Meyer et al. | |
| 6,634,980 B1 * | 10/2003 | Ziemer | 475/275 |
| 6,960,149 B2 * | 11/2005 | Ziemer | 475/276 |
| 6,984,187 B2 | 1/2006 | Biermann | |
| 6,991,578 B2 | 1/2006 | Ziemer | |
| 7,018,319 B2 | 3/2006 | Ziemer | |

* cited by examiner

*Primary Examiner* — Tisha Lewis (57) ABSTRACT

A transmission is provided having an input member, an output member, four planetary gear sets, a plurality of coupling members and a plurality of torque transmitting devices. Each of the planetary gear sets includes first, second and third members. The torque transmitting devices include clutches and brakes.

24 Claims, 4 Drawing Sheets

| GEAR STATE | GEAR RATIO | RATIO STEP | TORQUE-TRANSMITTING ELEMENTS ||||||
|---|---|---|---|---|---|---|---|---|
| | | | 36 | 34 | 26 | 28 | 32 | 30 |
| REV | -4.025 | | | X | | X | | X |
| N | | -0.88 | | O | | | | O |
| 1ST | 4.600 | | | X | | | X | X |
| 2ND | 3.163 | 1.45 | X | X | | | X | |
| 3RD | 2.330 | 1.36 | X | X | | | | X |
| 4TH | 1.900 | 1.23 | X | X | X | | | |
| 5TH | 1.481 | 1.28 | X | | X | | | X |
| 6TH | 1.179 | 1.26 | X | | X | | X | |
| 7TH | 1.000 | 1.18 | | | X | X | X | |
| 8TH | 0.823 | 1.22 | X | | X | X | | |
| 9TH | 0.688 | 1.20 | X | | | X | X | |
| 10TH | 0.638 | 1.08 | X | | | X | | X |

X = ON, CARRYING TORQUE
O = ON, NOT CARRYING TORQUE

| GEAR STATE | GEAR RATIO | RATIO STEP | TORQUE-TRANSMITTING ELEMENTS | | | | | |
|---|---|---|---|---|---|---|---|---|
| | | | 134 | 136 | 126 | 130 | 128 | 132 |
| REV | -4.042 | | | X | | | X | X |
| N | | -0.83 | | O | | | | O |
| 1ST | 4.850 | | | X | | X | | X |
| 2ND | 3.233 | 1.50 | X | X | | X | | |
| 3RD | 2.310 | 1.40 | X | X | | | | X |
| 4TH | 1.625 | 1.42 | | X | X | | | X |
| 5TH | 1.271 | 1.28 | X | | X | | | X |
| 6TH | 1.000 | 1.27 | | | X | | X | X |
| 7TH | 0.839 | 1.19 | X | | X | | X | |
| 8TH | 0.667 | 1.26 | X | | | X | X | |
| 9TH | 0.616 | 1.08 | X | | | | X | X |

X = ON, CARRYING TORQUE
O = ON, NOT CARRYING TORQUE

MULTI-SPEED TRANSMISSION

CROSS-REFERENCE TO RELATED APPLICATIONS

This application claims the benefit of U.S. Provisional Application No. 60/957,765 filed on Aug. 24, 2007. The disclosure of the above application is incorporated herein by reference.

FIELD

The invention relates generally to a multiple speed transmission having a plurality of planetary gear sets and a plurality of torque transmitting devices, and more particularly to a transmission having nine or ten speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

An embodiment of the transmission includes an input member, an output member, first, second, third and fourth planetary gear sets each having first, second and third members. A first interconnecting member continuously interconnects the first member of the first planetary gear set with the first member of the second planetary gear set, a second interconnecting member continuously interconnects the third member of the first planetary gear set with the second member of the second planetary gear set, a third interconnecting member continuously interconnects the first member of the third planetary gear set with the first member of the fourth planetary gear set, and a fourth interconnecting member continuously interconnects the second member of the third planetary gear set with the third member of the fourth planetary gear set and the output member. Six torque transmitting devices are selectively engageable to interconnect one of the first members, second members, and third members with at least one of the first members, second members, third members, and a stationary member. The torque transmitting devices are selectively engageable in combinations of at least three to establish at least nine forward speed ratios and at least one reverse speed ratio between the input member and the output member.

In one aspect of the present invention, a first of the six torque transmitting devices is selectively engageable to interconnect at least one of the input member and the second member of the first planetary gear set with the second member of the fourth planetary gear set.

In another aspect of the present invention, a second of the six torque transmitting devices is selectively engageable to interconnect at least one of the second member of the second planetary gear set and the third member of the first planetary gear set with the third member of the third planetary gear set.

In yet another aspect of the present invention, a third of the six torque transmitting devices is selectively engageable to interconnect at least one of the second member of the second planetary gear set and the third member of the first planetary gear set with at least one of the first member of the third planetary gear set and the first member of the fourth planetary gear set.

In yet another aspect of the present invention, a fourth of the six torque transmitting devices is selectively engageable to interconnect at least one of the first member of the first planetary gear set and the first member of the second planetary gear set with the stationary member.

In yet another aspect of the present invention, a fifth of the six torque transmitting devices is selectively engageable to interconnect at least one of the first member of the third planetary gear set and the first member of the fourth planetary gear set with the third member of the second planetary gear set.

In yet another aspect of the present invention, a sixth of the six torque transmitting devices is selectively engageable to interconnect the third member of the third planetary gear set with the stationary member.

In yet another aspect of the present invention, a fifth of the six torque transmitting devices is selectively engageable to interconnect at least one of the first member of the third planetary gear set and the first member of the fourth planetary gear set with the stationary member.

In yet another aspect of the present invention, a sixth of the six torque transmitting devices is selectively engageable to interconnect the third member of the third planetary gear set with the third member of the second planetary gear set.

In yet another aspect of the present invention, the first members are sun gears, the second members are carrier members, and the third members are ring gears.

In yet another aspect of the present invention, the first member of the first planetary gear set is a sun gear, the second member of the first planetary gear set is a carrier member, the third member of the first planetary gear set is a ring gear, the first member of the second planetary gear set is a sun gear, the second member of the second planetary gear set is a carrier member, the third member of the second planetary gear set is a ring gear, the first member of the third planetary gear set is ring gear, the second member of the third planetary gear set is a carrier member, the third member of the third planetary gear set is a sun gear, the first member of the fourth planetary gear set is a sun gear, the second member of the fourth planetary gear set is a ring gear, and the third member of the fourth planetary gear set is a carrier member.

In yet another aspect of the present invention, the input member is continuously interconnected with the second member of the first planetary gear set and the output member is continuously interconnected with at least one of the second member of the third planetary gear set and the third member of the fourth planetary gear set.

In yet another aspect of the present invention, two of the torque transmitting devices are brakes and four of the torque transmitting devices are clutches.

In yet another aspect of the present invention, the stationary member is a transmission housing.

Another embodiment of the transmission of the present invention includes an input member, an output member, first, second, third and fourth planetary gear sets each having a sun gear, a carrier member and a ring gear, wherein the input member is continuously interconnected with the carrier member of the first planetary gear set and wherein the output member is continuously interconnected with at least one of the carrier member of the third planetary gear set and the ring gear of the fourth planetary gear set. A first interconnecting member continuously interconnects the sun gear of the first planetary gear set with the sun gear of the second planetary gear set, a second interconnecting member continuously interconnects the ring gear of the first planetary gear set with the carrier member of the second planetary gear set, a third interconnecting member continuously interconnects the sun gear of the third planetary gear set with the sun gear of the fourth planetary gear set, and a fourth interconnecting member continuously interconnects the carrier member of the third planetary gear set with the ring gear of the fourth planetary gear set and the output member. A first torque transmitting device is selectively engageable to interconnect at least one of the input member and the carrier member of the first planetary gear set with the carrier member of the fourth planetary gear set. A second torque transmitting device is selectively engageable to interconnect at least one of the carrier member of the second planetary gear set and the ring gear of the first planetary gear set with the ring gear of the third planetary gear set. A third torque transmitting device is selectively engageable to interconnect at least one of the carrier member of the second planetary gear set and the ring gear of the first planetary gear set with at least one of the first member of the third planetary gear set and the first member of the fourth planetary gear set. A fourth torque transmitting device is selectively engageable to interconnect at least one of the first member of the first planetary gear set and the first member of the second planetary gear set with a stationary member. A fifth torque transmitting device is selectively engageable to interconnect at least one of the first member of the third planetary gear set and the first member of the fourth planetary gear set with the ring gear of the second planetary gear set. A sixth torque transmitting device is selectively engageable to interconnect the ring gear of the third planetary gear set with the stationary member. The torque transmitting devices are selectively engageable in combinations of at least three to establish at least ten forward speed ratios and at least one reverse speed ratio between the input member and the output member.

Another embodiment of the transmission of the present invention includes an input member, an output member, first, second, third and fourth planetary gear sets each having a sun gear, a carrier member, and a ring gear, wherein the input member is continuously interconnected with the carrier member of the first planetary gear set and wherein the output member is continuously interconnected with at least one of the carrier member of the third planetary gear set and the carrier member of the fourth planetary gear set. A first interconnecting member continuously interconnects the sun gear of the first planetary gear set with the sun gear of the second planetary gear set, a second interconnecting member continuously interconnects the ring gear of the first planetary gear set with the carrier member of the second planetary gear set, a third interconnecting member continuously interconnects the sun gear of the third planetary gear set with the sun gear of the fourth planetary gear set, and a fourth interconnecting member continuously interconnects the carrier member of the third planetary gear set with the ring gear of the fourth planetary gear set and the output member. A first torque transmitting device is selectively engageable to interconnect at least one of the input member and the carrier member of the first planetary gear set with the ring gear of the fourth planetary gear set. A second torque transmitting device is selectively engageable to interconnect at least one of the carrier member of the second planetary gear set and the ring gear of the first planetary gear set with the sun gear of the third planetary gear set. A third torque transmitting device is selectively engageable to interconnect at least one of the carrier member of the second planetary gear set and the ring gear of the first planetary gear set with at least one of the ring gear of the third planetary gear set and the sun gear of the fourth planetary gear set. A fourth torque transmitting device is selectively engageable to interconnect at least one of the sun gear of the first planetary gear set and the sun gear of the second planetary gear set with a stationary member. A fifth torque transmitting device is selectively engageable to interconnect at least one of the ring gear of the third planetary gear set and the sun gear of the fourth planetary gear set with the stationary member. A sixth torque transmitting device is selectively engageable to interconnect the sun gear of the third planetary gear set with the ring gear of the second planetary gear set. The torque transmitting devices are selectively engageable in combinations of at least three to establish at least nine forward speed ratios and at least one reverse speed ratio between the input member and the output member.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that in the particular example provided, the automatic transmission of the present invention has an arrangement of permanent mechanical connections between the elements of the four planetary gear sets. A first component or element of a first planetary gear set is permanently coupled to a first component or element of a second planetary gear set. A second component or element of the first planetary gear set is permanently coupled to a second component or element of the second planetary gear set. A first component or element of a third planetary gear set is permanently coupled to a first component or element of a fourth planetary gear set. Finally, a second component or element of the third planetary gear set is permanently coupled to a second component or element of the fourth planetary gear set.

Figure 1:
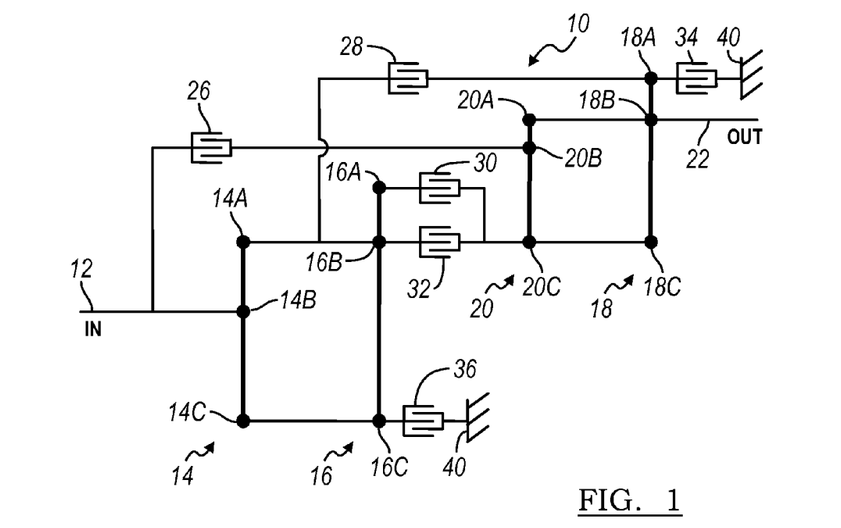
FIG. 1 is a lever diagram of an embodiment of a ten speed transmission according to the present invention.

Referring now to FIG. 1, an embodiment of a ten speed transmission 10 is illustrated in a lever diagram format. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input shaft or member 12 is coupled to the second node 14B of the first planetary gear set 14. The output shaft or member 22 is coupled to the second node 18B of the third planetary gear set 18. The first node 14A of the first planetary gear set 14 is coupled to the second node 16B of the second planetary gear set 16. The third node 14C of the first planetary gear set 14 is coupled to the third node 16C of the second planetary gear set 16. The second node 18B of the third planetary gear set 18 is coupled to the first node 20A of the fourth planetary gear set 20. The third node 18C of the third planetary gear set 18 is coupled to the third node 20C of the fourth planetary gear set 20.

A first clutch 26 selectively connects the input shaft or member 12 and the second node 14B of the first planetary gear set 14 with the second node 20B of the fourth planetary gear set 20. A second clutch 28 selectively connects the first node 14A of the first planetary gear set 14 and the second node 16B of the second planetary gear set 16 with the first node 18A of the third planetary gear set 18. A third clutch 30 selectively connects the first node 16A of the second planetary gear set 16 with the third node 20C of the fourth planetary gear set 20. A fourth clutch 32 selectively connects the second node 16B of the second planetary gear set 16 with the third node 20C of the fourth planetary gear set 20. A first brake 34 selectively connects the first node 18A of the third planetary gear set 18 with ground, stationary member, or transmission housing 40. A second brake 36 selectively connects the third node 16C of the second planetary gear set 16 with ground, stationary member, or transmission housing 40.

Figure 2:
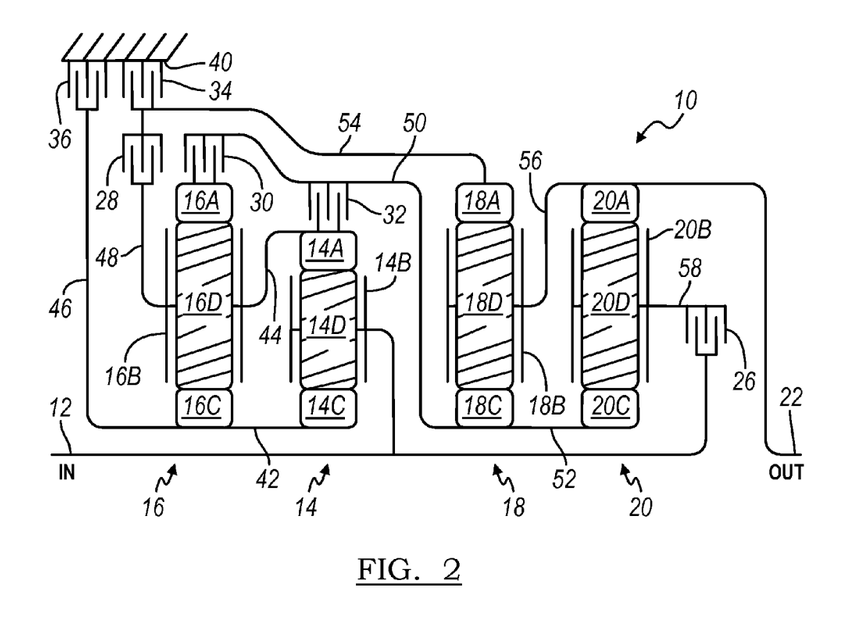
FIG. 2 is a diagrammatic view of an embodiment of a ten speed transmission according to the present invention.

Referring now to FIG. 2, a stick diagram presents a schematic layout of the embodiment of the ten speed transmission 10 according to the present invention. In FIG. 2, the numbering from the lever diagram of FIG. 1 is carried over. The clutches, brakes, and couplings are correspondingly presented whereas the nodes of the planetary gear sets now appear as components of planetary gear sets such as sun gears, ring gears, planet gears and planet gear carriers.

For example, the planetary gear set 14 includes a sun gear member 14C, a ring gear member 14A, and a planet gear carrier member 14B that rotatably supports a set of planet gears 14D (only one of which is shown). The planet gears 14D are each configured to intermesh with both the sun gear member 14C and the ring gear member 14A. The sun gear member 14C is connected for common rotation with a first shaft or interconnecting member 42. The ring gear member 14A is connected for common rotation with a second shaft or interconnecting member 44 and with the fourth clutch 32. The planet carrier member 14B is connected for common rotation with the input shaft or member 12.

The planetary gear set 16 includes a sun gear member 16C, a ring gear member 16A, and a planet gear carrier member 16B that rotatably supports a set of planet gears 16D (only one of which is shown). The planet gears 16D are each configured to intermesh with both the sun gear member 16C and the ring gear member 16A. The sun gear member 16C is connected for common rotation with the first interconnecting member 42 and with a third shaft or interconnecting member 46. The ring gear member 16A is connected for common rotation with the third clutch 30. The planet carrier member 16B is connected for common rotation with the second interconnecting member 44 and with a fourth shaft or interconnecting member 48.

The planetary gear set 18 includes a sun gear member 18C, a ring gear member 18A, and a planet gear carrier member 18B that rotatably supports a set of planet gears 18D (only one of which is shown). The planet gears 18D are each configured to intermesh with both the sun gear member 18C and the ring gear member 18A. The sun gear member 18C is connected for common rotation with a fifth shaft or interconnecting member 50 and with a sixth shaft or interconnecting member 52. The ring gear member 18A is connected for common rotation with a seventh shaft or interconnecting member 54. The planet carrier member 18B is connected for common rotation with an eighth shaft or interconnecting member 56.

The planetary gear set 20 includes a sun gear member 20C, a ring gear member 20A, and a planet gear carrier member 20B that rotatably supports a set of planet gears 20D (only one of which is shown). The planet gears 20D are each configured to intermesh with both the sun gear member 20C and the ring gear member 20A. The sun gear member 20C is connected for common rotation with the sixth interconnecting member 52. The ring gear member 20A is connected for common rotation with the eighth interconnecting member 56 and with the output shaft or member 22. The planet carrier member 20B is connected for common rotation with a ninth shaft or interconnecting member 58.

The input shaft or member 12 is preferably continuously connected to an engine (not shown) or to a turbine of a torque converter (not shown). The output shaft or member 22 is preferably continuously connected with the final drive unit or transfer case (not shown).

The torque transmitting devices or the clutches 26, 28, 30, 32 and the brakes 34, 36 allow for selective interconnection of the shafts or interconnecting members, members of the planetary gear sets and the housing. For example, the first clutch 26 is selectively engageable to connect the input shaft or member 12 with the ninth shaft or interconnecting member 58. The second clutch 28 is selectively engageable to connect the fourth shaft or interconnecting member 48 with the seventh shaft or interconnecting member 54. The third clutch 30 is selectively engageable to connect the ring gear member 16A with the fifth shaft or interconnecting member 50. The fourth clutch 32 is selectively engageable to connect the ring gear member 14A with the fifth shaft or interconnecting member 50. The first brake 34 is selectively engageable to connect the seventh shaft or interconnecting member 54 with a stationary member or the transmission housing 40 in order to prevent the seventh shaft or interconnecting member 54 and therefore the ring gear member 18A from rotating relative to the transmission housing 40. The second brake 36 is selectively engageable to connect the third shaft or interconnecting member 46 with a stationary member or the transmission housing 40 in order to prevent the third shaft or interconnecting member 46 and therefore the sun gear member 16C from rotating relative to the transmission housing 40.

Figure 3:
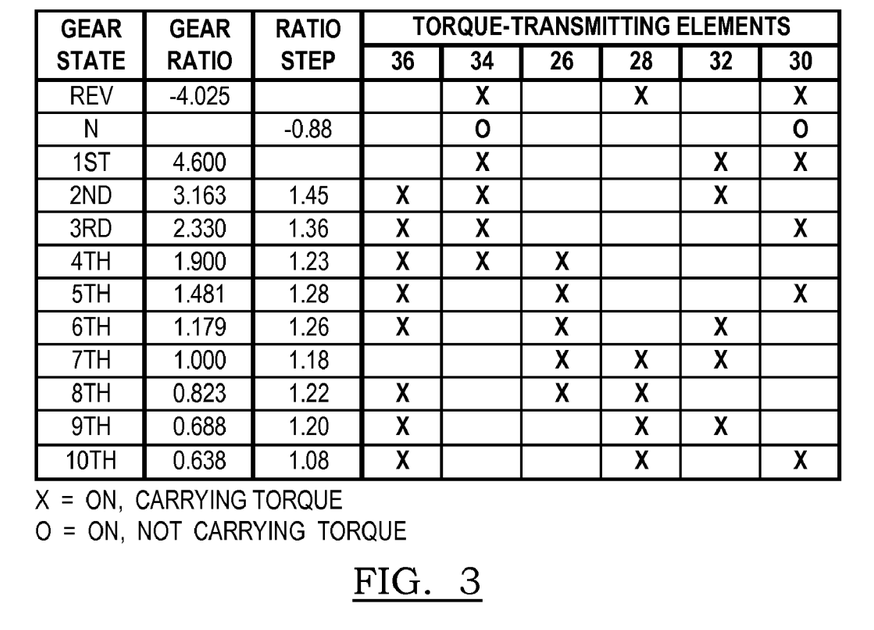
FIG. 3 is a truth table presenting the state of engagement of the various torque transmitting devices in each of the available forward and reverse speeds or gear ratios of the transmission illustrated in FIGS. 1 and 2.

Referring now to FIGS. 2 and 3, the operation of the embodiment of the ten speed transmission 10 will be described. It will be appreciated that the transmission 10 is capable of transmitting torque from the input shaft or member 12 to the output shaft or member 22 in at least ten forward speed or torque ratios and at least one reverse speed or torque ratio with a triple overdrive. Each forward and reverse speed or torque ratio is attained by engagement of one or more of the torque transmitting devices (i.e. first clutch 26, second clutch 28, third clutch 30, fourth clutch 32, first brake 34, and second brake 36), as will be explained below. FIG. 3 is a truth table presenting the various combinations of torque transmitting devices that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the second clutch 28, the third clutch 30, and the first brake 34 are engaged or activated. The second clutch 28 connects the fourth shaft or interconnecting member 48 with the seventh shaft or interconnecting member 54. The third clutch 30 connects the ring gear member 16A with the fifth shaft or interconnecting member 50. The first brake 34 connects the seventh shaft or interconnecting member 54 with a stationary member or the transmission housing 40 in order to prevent the seventh shaft or interconnecting member 54 and therefore the ring gear member 18A from rotating relative to the transmission housing 40. Likewise, the ten forward ratios are achieved through different combinations of clutch and brake engagement, as shown in FIG. 3.

It will be appreciated that the foregoing explanation of operation and gear states of the ten speed transmission 10 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Figure 4:
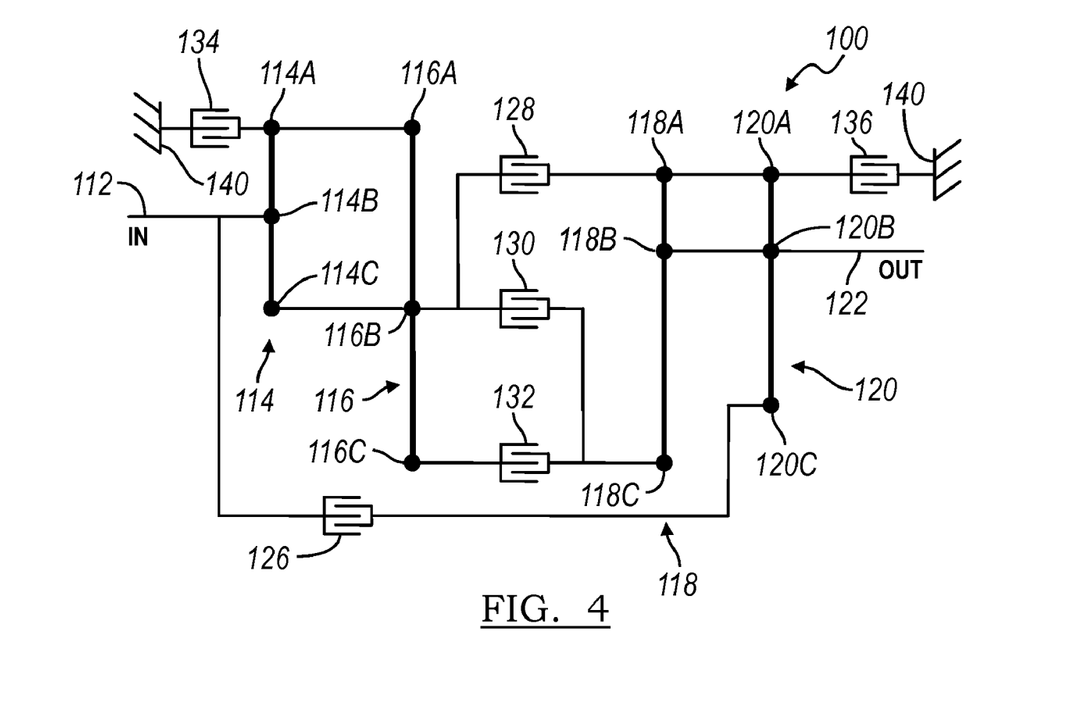
FIG. 4 is a lever diagram of an embodiment of a nine speed transmission according to the present invention.

Referring now to FIG. 4, an embodiment of a nine speed transmission 100 is illustrated in a lever diagram format. The transmission 100 includes an input shaft or member 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 118B and a third node 118C, a fourth planetary gear set 120 having three nodes: a first node 120A, a second node 120B and a third node 120C and an output shaft or member 122.

The input shaft or member 112 is coupled to the second node 114B of the first planetary gear set 114. The output shaft or member 122 is coupled to the second node 120B of the fourth planetary gear set 120. The first node 114A of the first planetary gear set 114 is coupled to the first node 116A of the second planetary gear set 116. The third node 114C of the first planetary gear set 114 is coupled to the second node 116B of the second planetary gear set 116. The first node 118A of the third planetary gear set 118 is coupled to the first node 120A of the fourth planetary gear set 120. The second node 118B of the third planetary gear set 118 is coupled to the second node 120B of the fourth planetary gear set 120.

A first clutch 126 selectively connects the input shaft or member 112 and the second node 114B of the first planetary gear set 114 with the third node 120C of the fourth planetary gear set 120. A second clutch 128 selectively connects the second node 116B of the second planetary gear set 116 with the first node 118A of the third planetary gear set 118. A third clutch 130 selectively connects the second node 116B of the second planetary gear set 116 with the third node 118C of the third planetary gear set 118. A fourth clutch 132 selectively connects the third node 116C of the second planetary gear set 116 with the third node 118C of the third planetary gear set 118. A first brake 134 selectively connects the first node 114A of the first planetary gear set 114 with a stationary member or a transmission housing 140. A second brake 136 selectively connects the first node 120A of the fourth planetary gear set 120 with a stationary member or the transmission housing 140.

Figure 5:
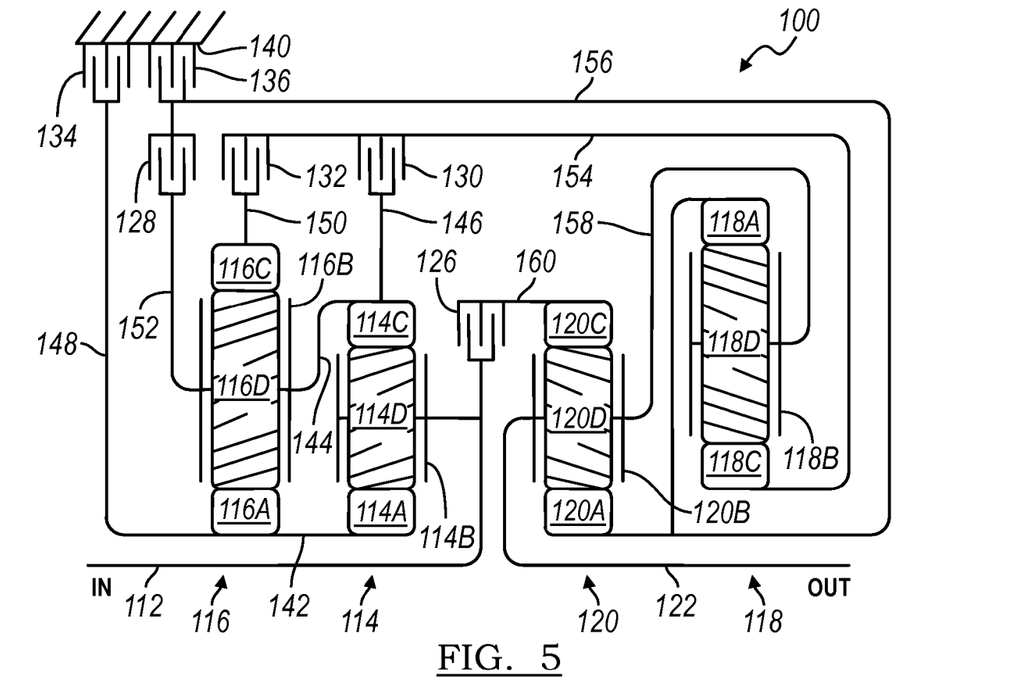
FIG. 5 is a diagrammatic view of an embodiment of a nine speed transmission according to the present invention.

Referring now to FIG. 5, a stick diagram presents a schematic layout of the embodiment of the nine speed transmission 100 according to the present invention. In FIG. 5, the numbering from the lever diagram of FIG. 4 is carried over. The clutches, brakes, and couplings are correspondingly presented whereas the nodes of the planetary gear sets now appear as components of planetary gear sets such as sun gears, ring gears, planet gears and planet gear carriers.

For example, the planetary gear set 114 includes a sun gear member 114A, a ring gear member 114C, and a planet gear carrier member 114B that rotatably supports a set of planet gears 114D (only one of which is shown). The planet gears 114D are each configured to intermesh with both the sun gear member 114A and the ring gear member 114C. The sun gear member 114A is connected for common rotation with a first shaft or interconnecting member 142. The ring gear member 114C is connected for common rotation with a second shaft or interconnecting member 144 and with a third shaft or interconnecting member 146. The planet carrier member 114B is connected for common rotation with the input shaft or member 112.

The planetary gear set 116 includes a sun gear member 116A, a ring gear member 116C, and a planet gear carrier member 116B that rotatably supports a set of planet gears 116D (only one of which is shown). The planet gears 116D are each configured to intermesh with both the sun gear member 116A and the ring gear member 116C. The sun gear member 116A is connected for common rotation with the first shaft or interconnecting member 142 and with a fourth shaft or interconnecting member 148. The ring gear member 116C is connected for common rotation with a fifth shaft or interconnecting member 150. The planet carrier member 116B is connected for common rotation with the second shaft or interconnecting member 144 and with a sixth shaft or interconnecting member 152.

The planetary gear set 118 includes a sun gear member 118C, a ring gear member 118A, and a planet gear carrier member 118B that rotatably supports a set of planet gears 118D (only one of which is shown). The planet gears 118D are each configured to intermesh with both the sun gear member 118C and the ring gear member 118A. The sun gear member 118C is connected for common rotation with a seventh shaft or interconnecting member 154. The ring gear member 118A is connected for common rotation with an eighth shaft or interconnecting member 156. The planet carrier member 118B is connected for common rotation with a ninth shaft or interconnecting member 158.

The planetary gear set 120 includes a sun gear member 120A, a ring gear member 120C, and a planet gear carrier member 120B that rotatably supports a set of planet gears 120D (only one of which is shown). The planet gears 120D are each configured to intermesh with both the sun gear member 120A and the ring gear member 120C. The sun gear member 120A is connected for common rotation with the eighth shaft or interconnecting member 156. The ring gear member 120C is connected for common rotation with a tenth shaft or interconnecting member 160. The planet carrier member 120B is connected for common rotation with the output shaft or member 122 and with the ninth shaft or interconnecting member 158.

The input shaft or member 112 is continuously connected to an engine (not shown) or to a turbine of a torque converter (not shown). The output shaft or member 122 is continuously connected with the final drive unit or transfer case (not shown).

The torque transmitting devices or the clutches 126, 128, 130, 132 and the brakes 134, 136 allow for selective interconnection of the shafts or interconnecting members, members of the planetary gear sets and the housing. For example, the first clutch 126 is selectively engageable to connect the input shaft or member 112 with the tenth shaft or interconnecting member 160. The second clutch 128 is selectively engageable to connect the sixth shaft or interconnecting member 152 with the eighth shaft or interconnecting member 156. The third clutch 130 is selectively engageable to connect the third shaft or interconnecting member 146 with the seventh shaft or interconnecting member 154. The fourth clutch 132 is selectively engageable to connect the fifth shaft or interconnecting member 150 with the seventh shaft or interconnecting member 154. The first brake 134 is selectively engageable to connect the fourth shaft or interconnecting member 148 with a stationary member or the transmission housing 140 in order to prevent the fourth shaft or interconnecting member 148 and therefore the sun gear member 116A and the sun gear member 114A from rotating relative to the transmission housing 140. The second brake 136 is selectively engageable to connect the eighth shaft or interconnecting member 156 with a stationary member or the transmission housing 140 in order to prevent the eighth shaft or interconnecting member 156 and therefore the ring gear member 118A and the sun gear member 120A from rotating relative to the transmission housing 140.

Figure 6:
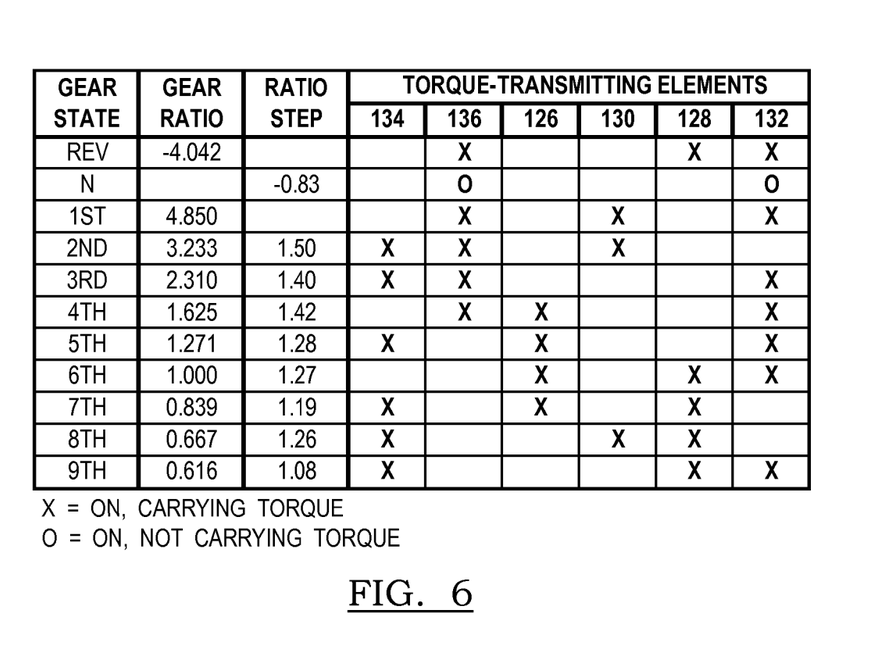
FIG. 6 is a truth table presenting the state of engagement of the various torque transmitting devices in each of the available forward and reverse speeds or gear ratios of the transmission illustrated in FIGS. 4 and 5.

Referring now to FIGS. 5 and 6, the operation of the embodiment of the nine speed transmission 100 will be described. It will be appreciated that the transmission 100 is capable of transmitting torque from the input shaft or member 112 to the output shaft or member 122 in at least nine forward speed or torque ratios and at least one reverse speed or torque ratio. Each forward and reverse speed or torque ratio is attained by engagement of one or more of the torque transmitting devices (i.e. first clutch 126, second clutch 128, third clutch 130, fourth clutch 132, first brake 134, and second brake 136), as will be explained below. FIG. 6 is a truth table presenting the various combinations of torque transmitting devices that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 100. An example of the gear ratios that may be obtained using the embodiments of the present invention are also shown in FIG. 6. Of course, other gear ratios are achievable depending on the gear diameter, gear teeth count and gear configuration selected.

To establish reverse gear, the second clutch 128, the fourth clutch 132, and the second brake 136 are engaged or activated. The second clutch 128 connects the sixth shaft or interconnecting member 152 with the eighth shaft or interconnecting member 156. The fourth clutch 132 connects the fifth shaft or interconnecting member 150 with the seventh shaft or interconnecting member 154. The second brake 136 connects the eighth shaft or interconnecting member 156 with a stationary member or the transmission housing 140 in order to prevent the eighth shaft or interconnecting member 156 and therefore the ring gear member 118A and the sun gear member 120A from rotating relative to the transmission housing 140. Likewise, the nine forward ratios are achieved through different combinations of clutch and brake engagement, as shown in FIG. 6.

It will be appreciated that the foregoing explanation of operation and gear states of the nine speed transmission 100 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Figure 7:
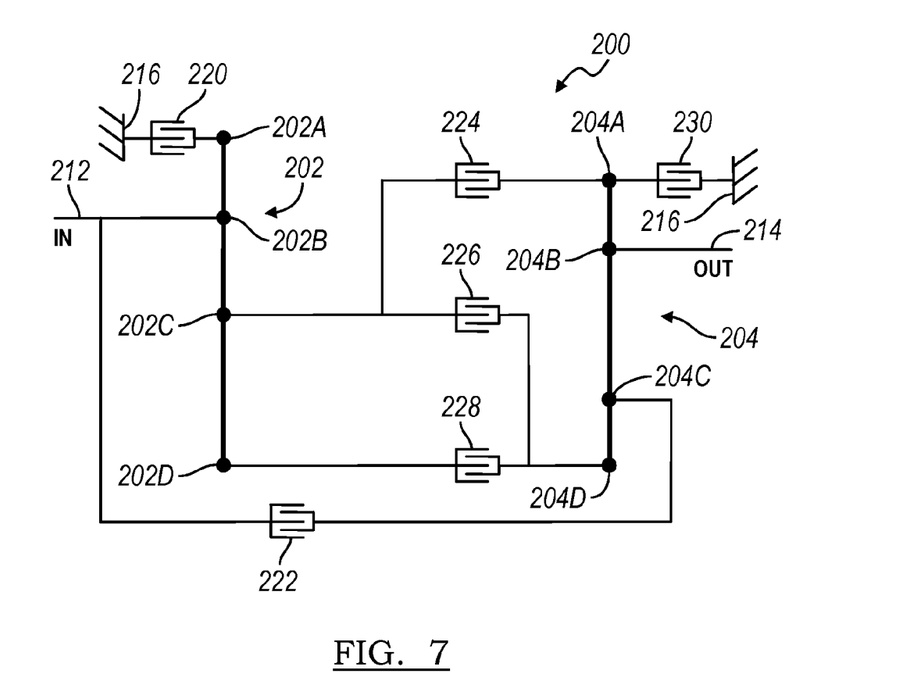
FIG. 7 is a combined lever diagram of an embodiment of the nine and ten speed transmissions according to the present invention.

Turning now to FIG. 7, an embodiment of a transmission 200 that combines the embodiments of the transmissions 10 and 100 is illustrated in a lever diagram format. The transmission 200 includes two levers including a first lever or planetary gear set assembly 202 that represents two planetary gear sets and a second lever or planetary gear set assembly 204 that represents another two planetary gear sets. The first lever 202 includes four nodes or elements: a first node 202A, a second node 202B, a third node 202C, and a fourth node 202D. The second lever 204 also includes four nodes: a first node 204A, a second node 204B, a third node 204C, and a fourth node 204D. Referring to both FIG. 4 and FIG. 7, the first node 202A of the first lever 202 represents a combination of the first node 114A of the first planetary gear set 114 and the first node 116A of the second planetary gear set 116. The second node 202B of the first lever 202 represents the second node 114B of the first planetary gear set 114. The third node 202C of the first lever 202 represents a combination of the third node 114C of the first planetary gear set 114 and the second node 116B of the second planetary gear set 116. The fourth node 202D of the first lever 202 represents the third node 116C of the second planetary gear set 116. The first node 204A of the second lever 204 represents a combination of the first node 118A of the third planetary gear set 118 and the first node 120A of the fourth planetary gear set 120. The second node 204B of the second lever 204 represents a combination of the second node 118B of the third planetary gear set 118 and the second node 120B of the fourth planetary gear set 120. The third node 204C of the second lever 204 represents the third node 120C of the fourth planetary gear set 120. The fourth node 204D of the first lever 204 represents the third node 118C of the third planetary gear set 118.

The second node 202B of the first lever 202 is coupled to an input shaft or member 212. The second node 204B of the second lever 204 is coupled to an output shaft or member 214. A first torque transmitting device 220 is selectively engageable to connect the first node 202A of the first lever 202 with a stationary member or a transmission housing 216. A second torque transmitting device 222 is selectively engageable to connect the input shaft or member 212 with the third node 204C of the second lever 204. A third torque transmitting device 224 is selectively engageable to connect the third node 202C of the first lever 202 with the first node 204A of the second lever 204. A fourth torque transmitting device 226 is selectively engageable to connect the third node 202C of the first lever 202 with the fourth node 204D of the second lever 204. A fifth torque transmitting device 228 is selectively engageable to connect the fourth node 202D of the first lever 202 with the fourth node 204D of the second lever 204. A sixth torque transmitting device 230 is selectively engageable to connect the first node 204A of the second lever 204 with a stationary member or the transmission housing 216.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
    an input member;
    an output member;
    first, second, third and fourth planetary gear sets each having first, second and third members, wherein the input member is continuously interconnected with one of the first, second, and third members of the planetary gear sets;
    a first interconnecting member continuously interconnecting the first member of the first planetary gear set with the first member of the second planetary gear set;
    a second interconnecting member continuously interconnecting the third member of the first planetary gear set with the second member of the second planetary gear set;
    a third interconnecting member continuously interconnecting the first member of the third planetary gear set with the first member of the fourth planetary gear set;
    a fourth interconnecting member continuously interconnecting the second member of the third planetary gear set with the third member of the fourth planetary gear set; and
    six torque transmitting devices each selectively engageable to interconnect one of the first members, second members, and third members of the planetary gear sets with at least one of another of the first members, second members, third members of the planetary gear sets, and a stationary member, and
    wherein the torque transmitting devices are selectively engageable in combinations of at least three to establish at least nine forward speed ratios and at least one reverse speed ratio between the input member and the output member.

2. The transmission of claim 1 wherein a first of the six torque transmitting devices is selectively engageable to interconnect the second member of the first planetary gear set with the second member of the fourth planetary gear set.

3. The transmission of claim 2 wherein a second of the six torque transmitting devices is selectively engageable to interconnect the second member of the second planetary gear set and the third member of the first planetary gear set with the third member of the third planetary gear set.

4. The transmission of claim 3 wherein a third of the six torque transmitting devices is selectively engageable to interconnect the second member of the second planetary gear set and the third member of the first planetary gear set with the first member of the third planetary gear set and the first member of the fourth planetary gear set.

5. The transmission of claim 4 wherein a fourth of the six torque transmitting devices is selectively engageable to interconnect the first member of the first planetary gear set and the first member of the second planetary gear set with the stationary member.

6. The transmission of claim 5 wherein a fifth of the six torque transmitting devices is selectively engageable to interconnect the first member of the third planetary gear set and the first member of the fourth planetary gear set with the third member of the second planetary gear set.

7. The transmission of claim 6 wherein a sixth of the six torque transmitting devices is selectively engageable to interconnect the third member of the third planetary gear set with the stationary member.

8. The transmission of claim 5 wherein a fifth of the six torque transmitting devices is selectively engageable to interconnect the first member of the third planetary gear set and the first member of the fourth planetary gear set with the stationary member.

9. The transmission of claim 8 wherein a sixth of the six torque transmitting devices is selectively engageable to interconnect the third member of the third planetary gear set with the third member of the second planetary gear set.

10. The transmission of claim 1 wherein the first members are sun gears, the second members are carrier members, and the third members are ring gears.

11. The transmission of claim 1 wherein the first member of the first planetary gear set is a sun gear, the second member of the first planetary gear set is a carrier member, the third member of the first planetary gear set is a ring gear, the first member of the second planetary gear set is a sun gear, the second member of the second planetary gear set is a carrier member, the third member of the second planetary gear set is a ring gear, the first member of the third planetary gear set is ring gear, the second member of the third planetary gear set is a carrier member, the third member of the third planetary gear set is a sun gear, the first member of the fourth planetary gear set is a sun gear, the second member of the fourth planetary gear set is a ring gear, and the third member of the fourth planetary gear set is a carrier member.

12. The transmission of claim 1 wherein the input member is continuously interconnected with the second member of the first planetary gear set and wherein the output member is continuously interconnected with the second member of the third planetary gear set and the third member of the fourth planetary gear set.

13. The transmission of claim 1 wherein two of the torque transmitting devices are brakes and four of the torque transmitting devices are clutches.

14. The transmission of claim 1 wherein the stationary member is a transmission housing.

15. A transmission comprising:
an input member;
an output member;
first, second, third and fourth planetary gear sets each having first, second and third members, wherein the input member is continuously interconnected with the second member of the first planetary gear set and wherein the output member is continuously interconnected with the second member of the third planetary gear set and the third member of the fourth planetary gear set;
a first interconnecting member continuously interconnecting the first member of the first planetary gear set with the first member of the second planetary gear set;
a second interconnecting member continuously interconnecting the third member of the first planetary gear set with the second member of the second planetary gear set;
a third interconnecting member continuously interconnecting the first member of the third planetary gear set with the first member of the fourth planetary gear set;
a fourth interconnecting member continuously interconnecting the second member of the third planetary gear set with the third member of the fourth planetary gear set;
a first torque transmitting device selectively engageable to interconnect the second member of the first planetary gear set with the second member of the fourth planetary gear set;
a second torque transmitting device selectively engageable to interconnect the second member of the second planetary gear set and the third member of the first planetary gear set with the third member of the third planetary gear set;
a third torque transmitting device selectively engageable to interconnect the second member of the second planetary gear set and the third member of the first planetary gear set with the first member of the third planetary gear set and the first member of the fourth planetary gear set;
a fourth torque transmitting device selectively engageable to interconnect the first member of the first planetary gear set and the first member of the second planetary gear set with a stationary member;
a fifth torque transmitting device selectively engageable to interconnect the first member of the third planetary gear set and the first member of the fourth planetary gear set with the third member of the second planetary gear set; and
a sixth torque transmitting device selectively engageable to interconnect the third member of the third planetary gear set with the stationary member, and
wherein the torque transmitting devices are selectively engageable in combinations of at least three to establish at least ten forward speed ratios and at least one reverse speed ratio between the input member and the output member.

16. The transmission of claim 15 wherein the first members are sun gears, the second members are carrier members, and the third members are ring gears.

17. The transmission of claim 15 wherein the stationary member is a transmission housing.

18. A transmission comprising:
an input member;
an output member;
first, second, third and fourth planetary gear sets each having first, second and third members, wherein the input member is continuously interconnected with the second member of the first planetary gear set and wherein the output member is continuously interconnected with the second member of the third planetary gear set and the third member of the fourth planetary gear set;
a first interconnecting member continuously interconnecting the first member of the first planetary gear set with the first member of the second planetary gear set;
a second interconnecting member continuously interconnecting the third member of the first planetary gear set with the second member of the second planetary gear set;
a third interconnecting member continuously interconnecting the first member of the third planetary gear set with the first member of the fourth planetary gear set;
a fourth interconnecting member continuously interconnecting the second member of the third planetary gear set with the third member of the fourth planetary gear set;
a first torque transmitting device selectively engageable to interconnect the second member of the first planetary gear set with the second member of the fourth planetary gear set;
a second torque transmitting device selectively engageable to interconnect the second member of the second planetary gear set and the third member of the first planetary gear set with the third member of the third planetary gear set;
a third torque transmitting device selectively engageable to interconnect the second member of the second planetary gear set and the third member of the first planetary gear set with the first member of the third planetary gear set and the first member of the fourth planetary gear set;
a fourth torque transmitting device selectively engageable to interconnect the first member of the first planetary gear set and the first member of the second planetary gear set with a stationary member;
a fifth torque transmitting device selectively engageable to interconnect the first member of the third planetary gear set and the first member of the fourth planetary gear set with the stationary member; and
a sixth torque transmitting device selectively engageable to interconnect the third member of the third planetary gear set with the third member of the second planetary gear set, and
wherein the torque transmitting devices are selectively engageable in combinations of at least three to establish at least nine forward speed ratios and at least one reverse speed ratio between the input member and the output member.

19. The transmission of claim 18 wherein the first member of the first planetary gear set is a sun gear, the second member of the first planetary gear set is a carrier member, the third member of the first planetary gear set is a ring gear, the first member of the second planetary gear set is a sun gear, the second member of the second planetary gear set is a carrier member, the third member of the second planetary gear set is a ring gear, the first member of the third planetary gear set is ring gear, the second member of the third planetary gear set is a carrier member, the third member of the third planetary gear set is a sun gear, the first member of the fourth planetary gear set is a sun gear, the second member of the fourth planetary gear set is a ring gear, and the third member of the fourth planetary gear set is a carrier member.

20. The transmission of claim 18 wherein the stationary member is a transmission housing.

21. A transmission comprising:
an input member;
an output member;
first, second, third and fourth planetary gear sets each having a sun gear, a carrier member and a ring gear, wherein the input member is continuously interconnected with the carrier member of the first planetary gear set and wherein the output member is continuously interconnected with the carrier member of the third planetary gear set and the ring gear of the fourth planetary gear set;
a first interconnecting member continuously interconnecting the sun gear of the first planetary gear set with the sun gear of the second planetary gear set;
a second interconnecting member continuously interconnecting the ring gear of the first planetary gear set with the carrier member of the second planetary gear set;
a third interconnecting member continuously interconnecting the sun gear of the third planetary gear set with the sun gear of the fourth planetary gear set;
a fourth interconnecting member continuously interconnecting the carrier member of the third planetary gear set with the ring gear of the fourth planetary gear set;
a first torque transmitting device selectively engageable to interconnect the carrier member of the first planetary gear set with the carrier member of the fourth planetary gear set;
a second torque transmitting device selectively engageable to interconnect the carrier member of the second planetary gear set and the ring gear of the first planetary gear set with the ring gear of the third planetary gear set;
a third torque transmitting device selectively engageable to interconnect the carrier member of the second planetary gear set and the ring gear of the first planetary gear set with the sun gear of the third planetary gear set and the sun gear of the fourth planetary gear set;
a fourth torque transmitting device selectively engageable to interconnect the sun gear of the first planetary gear set and the sun gear of the second planetary gear set with a stationary member;
a fifth torque transmitting device selectively engageable to interconnect the sun gear of the third planetary gear set and the sun gear of the fourth planetary gear set with the ring gear of the second planetary gear set; and
a sixth torque transmitting device selectively engageable to interconnect the ring gear of the third planetary gear set with the stationary member, and
wherein the torque transmitting devices are selectively engageable in combinations of at least three to establish at least ten forward speed ratios and at least one reverse speed ratio between the input member and the output member.

22. The transmission of claim 21 wherein the stationary member is a transmission housing.

23. A transmission comprising:
an input member;
an output member;
first, second, third and fourth planetary gear sets each having a sun gear, a carrier member, and a ring gear, wherein the input member is continuously interconnected with the carrier member of the first planetary gear set and wherein the output member is continuously interconnected with the carrier member of the third planetary gear set and the carrier member of the fourth planetary gear set;
a first interconnecting member continuously interconnecting the sun gear of the first planetary gear set with the sun gear of the second planetary gear set;
a second interconnecting member continuously interconnecting the ring gear of the first planetary gear set with the carrier member of the second planetary gear set;
a third interconnecting member continuously interconnecting the ring gear of the third planetary gear set with the sun gear of the fourth planetary gear set;
a fourth interconnecting member continuously interconnecting the carrier member of the third planetary gear set with the carrier member of the fourth planetary gear set;
a first torque transmitting device selectively engageable to interconnect the input member and the carrier member of the first planetary gear set with the ring gear of the fourth planetary gear set;
a second torque transmitting device selectively engageable to interconnect the carrier member of the second planetary gear set and the ring gear of the first planetary gear set with the sun gear of the third planetary gear set;
a third torque transmitting device selectively engageable to interconnect the carrier member of the second planetary gear set and the ring gear of the first planetary gear set with the ring gear of the third planetary gear set and the sun gear of the fourth planetary gear set;
a fourth torque transmitting device selectively engageable to interconnect the sun gear of the first planetary gear set and the sun gear of the second planetary gear set with a stationary member;
a fifth torque transmitting device selectively engageable to interconnect the ring gear of the third planetary gear set and the sun gear of the fourth planetary gear set with the stationary member; and
a sixth torque transmitting device selectively engageable to interconnect the sun gear of the third planetary gear set with the ring gear of the second planetary gear set, and
wherein the torque transmitting devices are selectively engageable in combinations of at least three to establish at least nine forward speed ratios and at least one reverse speed ratio between the input member and the output member.

24. The transmission of claim 23 wherein the stationary member is a transmission housing.

* * * * *